Patented Feb. 4, 1936

2,029,560

UNITED STATES PATENT OFFICE 2,029,560

CRYSTALLIZATION OF DEXTROSE

Charles J. Copland, North Kansas City, Mo., assignor to International Patents Development Company, Wilmington, Del., a corporation of Delaware No Drawing. Application August 24, 1934, Serial No. 741,278

2 Claims. (Cl. 127—58)

This invention relates to the production from starch converted dextrose solutions of crystalline dextrose, particularly dextrose which, in the finished state, contains substantially no impurities; and is concerned particularly with the method of crystallization in motion of the dextrose solution in a crystallizer which is filled incrementally.

By the term "crystallization in motion" is intended that method in accordance with which the contents of the crystallizer are kept in substantially continuous gentle agitation by means, for example, of a rotating spiral agitator with the result that the solid phase, as developed, is maintained in approximately uniform dispersion through the liquid. The agitation, or slow motion, is continued until the end of the crystallizing operation so that the magma does not have a chance to solidify. It is discharged from the crystallizer, in a somewhat fluent state, to the centrifugal machines, in which the mother liquor is separated from the crystals and the crystals thereafter washed with fresh water; so that, if the crystallization is properly carried out, the resultant product will be substantially pure, containing only a negligible fraction of one per cent of non-dextrose substances.

By referring to the process as one involving "incremental filling" of the crystallizer is intended a method, such as that disclosed in U. S. patent to Charles J. Copland and William B. Newkirk, No. 1,954,584 granted April 10, 1934, whereby the crystallizer instead of being filled at once to capacity, upon or with the addition of dry seed or of foots from a previous crystallizing operation, is filled by the introduction of the liquor in relatively small amounts at intervals. This method of incremental filling may be used for starting the process, where the practice is, after one or more crystallizing operations have been completed and purgeable massecuites produced, to use foots from one batch for seeding the next in accordance with the principle of operation of Patent 1,521,830, W. B. Newkirk, January 6, 1925; or the crystallization of each batch may be a separate and complete operation, in which case controlling solid phase for the operation may be developed either spontaneously, without seed, in the volumes of liquor first introduced into the crystallizer, or dry seed may be used for facilitating induction at this stage of the process; or the principle of incremental filling may be combined with the use of foots so as to make it possible to reserve less of each finished batch of massecuite for seeding the next batch than when the crystallizer is filled to capacity at the beginning of the operation. That is, the solid phase present in any supersaturated dextrose solution controls crystallization in proportion to its quantity and dispersion; and, consequently, by reducing the amount of liquor first introduced into the crystallizer it is possible to reduce the amount of solid phase used for obtaining the same control effect, provided, however, that by the time the next volume of liquor has been added to the crystallizer there has been induced an additional amount of solid phase sufficient, with that originally introduced, to maintain control in the larger volume of solution.

The method of incremental filling, however, sometimes results in poor massecuites, evidenced by difficulties in the centrifuging operation, e. g., long spinning time, high washing losses and reduced yields; and this, it is believed, is due to the fact that the distribution of the solid phase in the liquid, during the first stage or stages of the process is poor. The helicoidal agitator, with which sugar crystallizers are ordinarily provided, does not act effectively as a mixer when the amount of the liquid is small. The result is that the induction of solid phase does not proceed in an altogether correct manner, and this appears to affect the character of the growth of the crystals which takes place, or should take place, to the exclusion of the formation of new crystals, during the later stages of the crystallizing operation; or possibly through irregularity in the control of induction in the first stages there will be continued induction in the later stages, where induction should have ceased, with the result of a larger quantity of small crystals in the finished massecuite than there should be, with consequent difficulties in centrifuging.

However this may be, it has been discovered that the known difficulties in centrifuging, where the principle of incremental filling has been used—and this discovery is the basis of the present invention—are overcome if the super-saturation of the massecuite is lowered at an intermediate stage of the crystallizing operation with the result that more readily purgeable massecuites and increased yields are produced. This reduction in supersaturation is brought about, in accordance with the present invention, by using for one or more of the filling increments a dextrose liquor of lower density, that is lower content of solids, than is used for the rest of the batch. This reduces, and may even destroy for a time, supersaturation, slowing up the process and thereby preventing any forced crystallization resulting in crystals difficult to purge, and probably allowing the already formed crystals, if too small or malformed, to properly develop before, by the cooling of the massecuite that follows, crystallization proceeds again at the higher rate.

The following is a typical example illustrating the practice of the process by use of a crystallizer of about 110,000 pounds capacity. The crystallizer was a horizontally placed cylindrical vessel provided with a helicoidal constantly rotating agitator and with a water jacket through which water could be circulated to promote and/or control the cooling of the massecuite by which supersaturation is maintained. The crystallizer as usual was filled to within a few inches of the top. Its diameter was 114 inches.

The initial amount of liquor introduced in the crystallizer was 476 pounds containing 370 pounds dry substance, giving a density of 40.5° Baumé. The entering liquor had a temperature of 120° F. (It might have been considerably higher or on the other hand lower than this) and stood at a 2 inch level in the crystallizer. After about 15 hours the liquor had cooled to 85° F. whereupon 1823 pounds of fresh liquor containing 1397 pounds of dry substance and having a Baumé of 39.9° and a temperature of 160° was introduced, raising the liquid level to 6 inches. The batch was then cooled to a temperature from 110° to 120°, which was approximately the temperature to which the batch was reduced after each increment and before the next increment was introduced.

After about 10½ hours a third increment of 9190 pounds, dry substance 7076 pounds, density 41.1° Baumé, and a temperature of 160° F. was added, bringing the level to 18 inches.

The next increment consisted of the lower density liquor. It was added about 21 hours later and consisted of 1725 pounds of liquor containing 956 pounds dry substance, the liquor having a density of 30° Baumé and an entering temperature of 140° F. and raising the level to 20 inches. The added liquor contained at this density enough dextrose so that any appreciable dissolving of solid phase in the massecuite was avoided.

The gravity of the massecuite after introduction of the 30° Baumé increment was 38.7° Baumé.

The next increment was introduced after a little less than three hours later. It consisted of 20,936 pounds of liquor, dry substance 16,200 pounds, density 40.3° Baumé and entering temperature 160° F.

The last increment was introduced about 15 hours later and consisted of 74,758 pounds of liquor containing 57,115 pounds of dry substance and having a density of 39.8° Baumé and an entering temperature of 140° F. This raised the liquid level to 105 inches, the batch now weighing 108,908 pounds, close to the theoretical 110,000 pound capacity.

The crystallization of the batch from now on proceeded as usual, cold water being circulated through the water jacket, at intervals, to hasten the cooling operation. The curing period from the time the crystallizer was filled to the 105 inch level until the finished massecuite was delivered to the centrifugals was 172.75 hours.

The yield was higher than is usual with incrementally filled crystallizers where, as in this case, no induction seed is used.

The above example is to be regarded as typical, not as limiting the invention to these particular data. It is the intention to cover all modifications of the process within the scope of the appended claims.

I claim:

1. In the method of crystallizing dextrose solutions by cooling, with agitation, in a crystallizer in which the crystals are developed in a portion of the solution introduced initially into the crystallizer and the rest of the solution introduced at intervals incrementally: the improvement which comprises reducing the super-saturation at an intermediate stage of the operation by use of an increment of solution having a substantially lower density than the rest of the solution.

2. In the method of crystallizing dextrose solutions by cooling, with agitation, in a crystallizer in which the crystals are developed in a portion of the solution introduced initially into the crystallizer and the rest of the solution introduced at intervals incrementally: the improvement which comprises using for one or more of the increments a dextrose solution having a density of approximately 30° Baumé and for the rest of the solution a dextrose solution of approximately 40° Baumé.

CHARLES J. COPLAND.